(12) United States Patent
Dehghan-Manshadi et al.

(10) Patent No.: US 6,353,991 B1
(45) Date of Patent: Mar. 12, 2002

(54) SHAPED PART WITH A SPIGOT

(75) Inventors: Jahangir Dehghan-Manshadi, Mainhardt-Ammertsweiler; Dimiter Kolev, Stuttgart; Harald Kapitza, Ldwigsburg; Klaus-Peter Noack, Obersulm, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/508,143

(22) PCT Filed: Sep. 14, 1998

(86) PCT No.: PCT/EP98/05824
§ 371 Date: Mar. 7, 2000
§ 102(e) Date: Mar. 7, 2000

(87) PCT Pub. No.: WO99/14086
PCT Pub. Date: Mar. 25, 1999

(30) Foreign Application Priority Data

Sep. 12, 1997 (DE) .......................... 197 40 067

(51) Int. Cl.[7] .............................................. B21D 39/00
(52) U.S. Cl. ........................... 29/516; 403/230; 403/282
(58) Field of Search .......................... 29/516, 505, 515, 29/517, 518; 403/214, 265, 230, 274, 282; 285/382, 256

(56) References Cited

U.S. PATENT DOCUMENTS 4,523,872 A * 6/1985 Arena et al. ................. 403/274
5,279,181 A * 1/1994 Boudreau .................. 74/551.1
5,314,204 A * 5/1994 DuRochester et al. ...... 280/777

FOREIGN PATENT DOCUMENTS

| DE | 29 20 899 | 1/1981 |
| DE | 43 33 484 | 5/1994 |
| DE | 195 16 830 | 5/1995 |
| DE | 195 40 869 | 6/1996 |
| EP | 0 694 455 | 1/1996 |
| FR | 2 670 730 | 6/1992 |
| GB | 2 218 622 | 11/1989 |
| WO | 96/26024 | 8/1996 |

* cited by examiner

Primary Examiner—S. Thomas Hughes
Assistant Examiner—John C. Hong
(74) Attorney, Agent, or Firm—J. Gordon Lewis

(57) ABSTRACT

The invention relates to a shaped part with a spigot for connecting to a tube, whereby the spigot contains a number of cavities arranged in the direction of the longitudinal axis thereof. The invention can be used in joining techniques especially in the area of automobile manufacturing, particularly windshield wiper assemblies. In preart windshield wiper assemblies, the connection between the spigot and the tube can detach during transmission of power or momentum. The invention prevents detaching of the connection between the spigot and the tube. To this end, the invention comprises two adjacent cavities each separated from one another by two catches. The catches extend perpendicular to the longitudinal axis of the spigot resulting in a solid crimping in the area of the cavity. The invention also relates to a method for connecting the inventive shaped part to a tube.

6 Claims, 2 Drawing Sheets

SHAPED PART WITH A SPIGOT

BACKGROUND OF THE INVENTION

1. Field of the Invention

The invention pertains to a shaped part with a spigot for connecting to a tube, while the spigot has several troughs arranged in the direction of its longitudinal axis. The invention is applicable to the field of assembly technology, especially in the area of automotive technology and thereto windshield wiper equipment.

2. Description of the Art

Windshield wiper assemblies for automobiles are often of modular design. Each wiper bearing is equipped with a spigot which is fixed in a carrier designed as a tube. The tube connects the wiper bearing to the wiper motor. The attachment of the tube to the spigot is accomplished by plastic deformation of the tube, which is also called crimping. The crimping ensures that forces and moments can be coupled between the spigot and the tube.

A windshield wiper assembly with a tubular carrier that is affixed to a tab or a spigot of a wiper bearing is known from DE 2 920 899. The spigot has four trough-like recesses at right angles to its longitudinal axis, two of which are always oppositely arranged. Carrier material is forced into the recesses by means of a plunger, which is designed to complement the recess form that makes contact with the entire recessed area of the spigot.

In the case of the known wiper assembly, the union between the spigot and the tube may separate during the transfer of forces and moments. This may especially be the case when great temperature fluctuations are involved, such as temperatures ranging from −400° C. to +1,200° C. However, separation of the connection may also occur with lengthy constant operation of the windshield wiper assembly or when the wiper is blocked, for example, by snow or ice. Separation of the connection between the spigot and the tube results in unacceptable loud noise when the wiper assembly is operated.

Accordingly, the problem fundamental to the invention is one of making available a shaped part with a spigot that overcomes the aforesaid disadvantages. In particular, separation of the connection between the spigot and the tube should be precluded even under marginally extreme conditions.

The problem is solved by the shaped part disclosed in the independent Patent Claim. Special embodiment forms of the invention are disclosed in the subordinate claims.

SUMMARY OF THE INVENTION

The problem is solved by a shaped part with a spigot designed for joining to a tube, wherein the spigot has several troughs arranged in the direction of its longitudinal axis, in each case two adjoining troughs are separated by two projections extending at right angles to the longitudinal axis of the spigot. Within the framework of the present invention, an FEM calculation of the solution described above has shown that the type and the degree of the forming operation has a great influence on the instabilities of the crimping. In the known technique, full plastification is not attained in some crimp areas. This results in high residual tensions after release of the tool. These tensions develop into compressive stresses and, under external strains, form an unstable tension state in the tubular piece and cause further deviation from the normal contour. The contact surfaces between the spigot and the tube are not adequately constructed which can lead to a separation of the union. Characteristic of the invention by virtue of the separation of the troughs by the projections and prior to the release of the tool, the compressive stresses are surrounded by tensile stresses that are greater than the compressive stresses. These tension differences and distributions based on the geometry of the troughs are advantageous, as the stresses are reversed after release of the tool. This means that the tensile forces are converted into compressive forces, i.e., in the direction of the interior of the trough, and the compressive forces are converted into tensile forces, i.e., away from the core. The stronger tensile forces act against the enclosed compressive forces and result in a good, homogeneous distribution of the compressive stress on the core. Thereby a stable crimping in the trough area is realized.

A special embodiment of the invention is characterized in that each of the projections has two projection wings that extend out from the edges of the trough and are first concavely and then convexly curved. The concave/convex transitions of the projections act counter to axial stresses. With these transitions, a "clutching" of the material of the tube around the spigot results. This effect is realized by opposing compressive forces in the concave areas. By means of the convex transitions, a stable equilibrium is achieved.

Another special embodiment form of the invention is characterized in that the spigot has at least three troughs and that an inversion snub is located in the middle trough of the three troughs. The inversion snub ensures a better stability of the middle trough and thus makes possible a homogenization of the stress distribution in the base. As a result, the base area does not lift away from the spigot when the tool is released.

Yet another special embodiment form of the invention is characterized in that the troughs are located on opposite sides of the circumference of the spigot. An especially secure seating of the tube on the spigot is thereby achieved.

The precept of the present invention also encompasses a process for connecting the shaped part described above to a tube, which is characterized by the following steps: the tube is slipped over the spigot; the tube together with the spigot is placed into a double-action tool with two crimpers; the tool is closed in such a way that it encircles the tube, while the spigot is fixed relative to the tool by the grasping hole, and the two crimpers are brought together; the tube is plastically deformed, surrounds the spigot, and assumes the geometry of the spigot or the crimpers in the area of the deformation zone.

The technical advantage of a union of a tube with a spigot by this process lies in the fact that an almost stress-free state of equilibrium is established in the tube. This means that no unstable condition of stress develops due to external strains that might lead in turn to separation of the connection.

The solution according to the invention results in adequate plastification, i.e., a good flow of material and concurrently a good strengthening is achieved. Sufficient contact zones and stable stress conditions are thereby realized.

BRIEF DESCRIPTION OF THE DRAWING

Additional advantages, characteristics, and details of the invention are set forth in the claims as is the following description, in which an embodiment is described in detail with references to the appended drawing. Here, each of the characteristics noted in the claims and in the description can have inventive merit individually or in any combination. A way to execute the claimed invention is explained below in detail with references to the drawing in which:

DESCRIPTION OF THE PREFERRED EMBODIMENT

Figure 1:
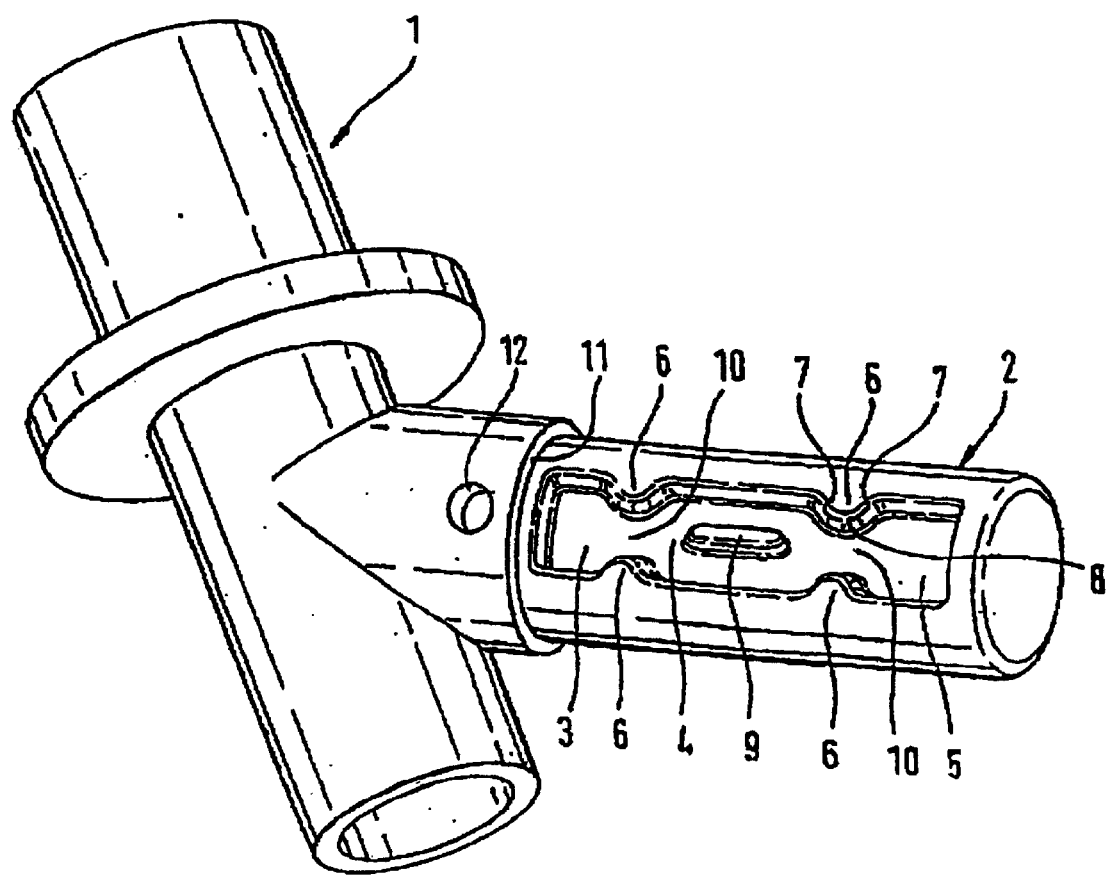
FIG. 1 is a perspective depicted of a shaped part according to the invention.
Figure 2:
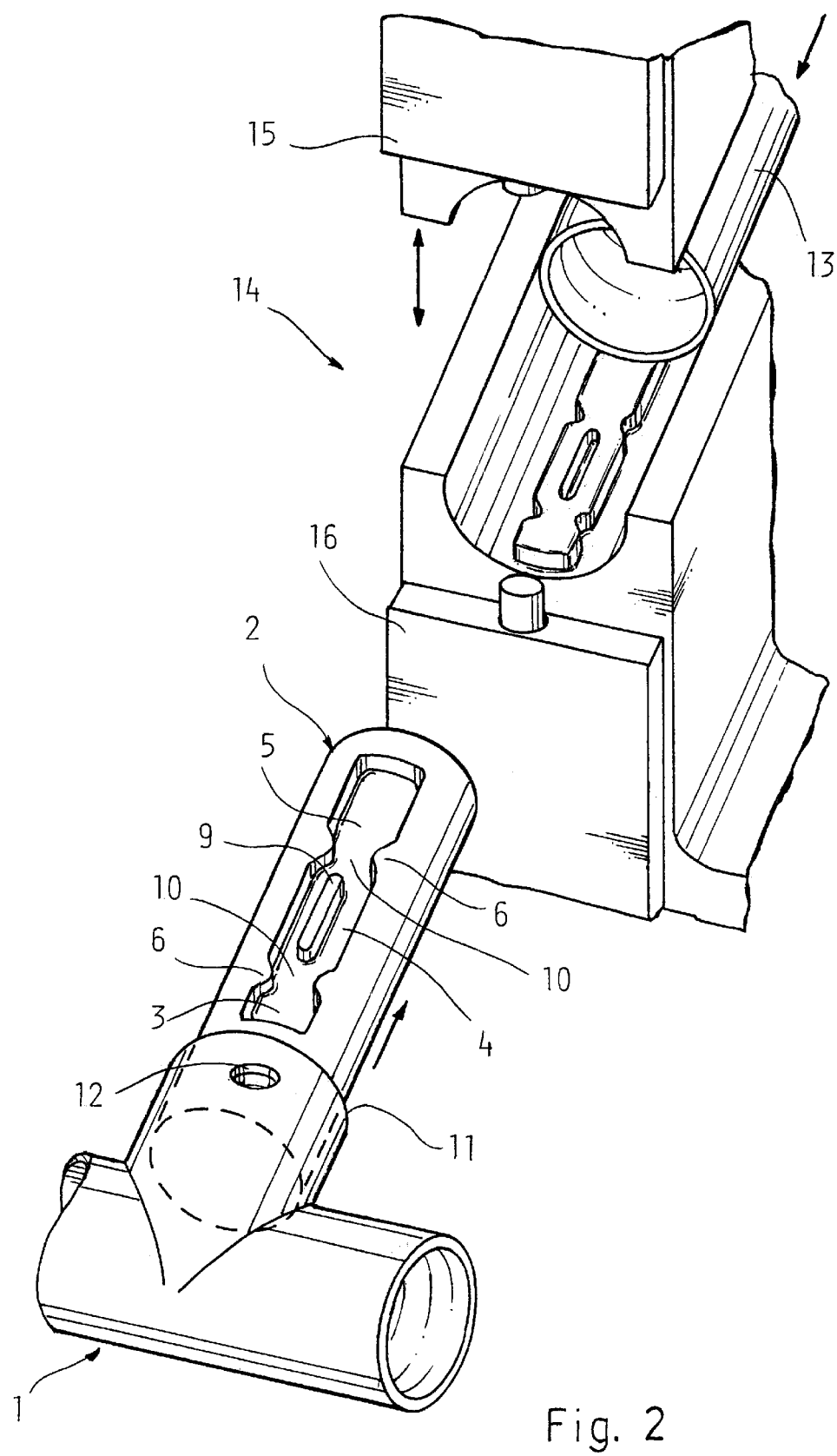
FIG. 2 is a perspective view of a crimping tool for the shaped part.

The shaped part 1 is a bearing bush of an undepicted windshield wiper assembly. Formed on the shaped part 1 is a cylindrical spigot 2, which acts as the receptacle for an undepicted tube. One end of the tube is connected to the spigot 2 by crimping. The crimping serves to transfer forces between the shaped part of the spigot and the tube. The other end of the tube is connected to an undepicted carrier element on which the wiper motor is mounted.

Formed in the spigot are three troughs 3, 4, 5. These troughs 3, 4, 5 are separated by projections 6. Between any two adjoining troughs there are always two opposing projections 6. Left between two opposing projections 6 is a free space 10. The free spaces 10 connect troughs 3, 4, 5 together. The projections 6 extend from the edge of the troughs at right angles to the longitudinal axis of the spigot 2. Each projection has two opposing projection wings 7 which are concavely curved. The projection wings 7 merge into a projection tip 8 which is convexly curved.

An inversion snub 9 is formed in the middle trough 4. The inversion snub 9 extends between the free spaces 10, and has approximately the same height as the projections 6.

For connecting a shaped part 1 to a tube by crimping, according to the invention, either the spigot 2 of the shaped part 1 is inserted into the end of the tube or the end of the tube is slipped onto the spigot 2 of the shaped part 1 until an engaged length of the spigot 2 commensurate with the installation requirement is reached. The essential engaged length of the spigot 2 can be defined, for example, by a stop ring 11 provided on the shaped part, which then makes contact with the end of the tube. Then the tube 13 with the spigot 2 is placed into a double-action tool 14 with two crimpers 15, 16. In a first step, the tool is closed in such a way that the tube is encircled by the tool. Here, the positioning of the spigot 2 in the tool is controlled by a grasping hole 12 provided in the shaped part 1 near the stop ring 11. By means of the grasping hole 12, an exact positioning of the crimpers relative to the spigot 2 is ensured, which is decisive for the quality of the crimping. In a second step, the two crimpers of the tool move together from opposing directions. The tube is plastically deformed thereby and assumes the geometry of the spigot 2 or the crimpers in the area of the deformation zone. The contour of the crimpers is designed to be complementary to the contour of the spigot 2.

The solution according to the invention can be adapted to a spigot or tube of any diameter.

What is claimed is:

1. A shaped part with a spigot for connecting to a tube comprising:

a solid spigot body having a longitudinally elongate continuous depression formed in an outer surface thereof from a plurality of troughs arranged in a direction of the longitudinal axis of the spigot body, where two adjoining troughs are defined by two opposing projections extending circumferentially at right angles to the longitudinal axis of the spigot body, and an inversion snub running in the longitudinal direction of the spigot body formed in one of the troughs.

2. The shaped part of claim 1, further comprising each of the projections having two projection wings extending out from the edges of the troughs formed first concavely and then convexly curved.

3. The shaped part of claim 1, further comprising the spigot body having at least three troughs, and the inversion snub running in the longitudinal direction of the spigot body formed in a middle trough of the three troughs.

4. The shaped part of claim 1, further comprising a grasping aperture provided near the spigot body.

5. The shaped part of claim 1, further comprising opposing longitudinally elongate continuous depressions formed from a plurality of troughs formed on opposing sides of a circumference of the spigot body.

6. A process for connecting a shaped part of claim 4 to a tube, comprising the steps of:

slipping the tube over the spigot body;

placing the tube together with the spigot body into a double-action tool with two crimpers;

closing the tool such that the tool encircles the tube, while the spigot body is fixed relative to the tool by the grasping hole and the two crimpers come together; and plastically deforming the tube so that the tube surrounds the spigot body and assumes the geometry of one of the spigot body and the crimpers in the area of a deformation zone.

* * * * *